(12) United States Patent
Girardier et al.

(10) Patent No.: US 12,455,925 B2
(45) Date of Patent: *Oct. 28, 2025

(54) REAL-TIME VOICE PROCESSING

(71) Applicant: Google LLC, Mountain View, CA (US)

(72) Inventors: Thomas Girardier, Poisy (FR); Julien Goupy, Le Mesnil-Saint-Denis (FR); Etienne Ruffieux, Paris (FR)

(73) Assignee: GOOGLE LLC, Mountain View, CA (US)

( * ) Notice: Subject to any disclaimer, the term of this patent is extended or adjusted under 35 U.S.C. 154(b) by 160 days.

This patent is subject to a terminal disclaimer.

(21) Appl. No.: 18/357,593

(22) Filed: Jul. 24, 2023

(65) Prior Publication Data

US 2023/0367817 A1 Nov. 16, 2023

Related U.S. Application Data

(63) Continuation of application No. 16/756,066, filed as application No. PCT/EP2018/076821 on Oct. 2, 2018, now Pat. No. 11,755,653.

(30) Foreign Application Priority Data

Oct. 20, 2017 (EP) ..................................... 17306438

(51) Int. Cl.
*G06F 16/9032* (2019.01)
*G06F 40/45* (2020.01)
(Continued)

(52) U.S. Cl.
CPC ........ *G06F 16/90332* (2019.01); *G06F 40/45* (2020.01); *G06F 40/47* (2020.01);
(Continued)

(58) Field of Classification Search
CPC .......... G06F 40/58; G06F 40/45; G06F 40/47; G06F 40/55
See application file for complete search history.

(56) References Cited

U.S. PATENT DOCUMENTS

| | | | |
|---|---|---|---|
| 10,216,729 B2 * | 2/2019 | Kim | G06F 40/58 |
| 11,755,653 B2 * | 9/2023 | Girardier | G06F 40/45 |
| | | | 704/275 |

(Continued)

FOREIGN PATENT DOCUMENTS

| | | |
|---|---|---|
| CN | 104303177 A | 1/2015 |
| CN | 205942689 U | 2/2017 |

(Continued)

*Primary Examiner* — Samuel G Neway
(74) *Attorney, Agent, or Firm* — DORITY & MANNING P.A.

(57) ABSTRACT

Systems, methods, and machine-readable media facilitate voice distribution. A wireless, bidirectional audio link with each auxiliary device of a plurality of auxiliary devices may be established and simultaneously managed. A first audio signal comprising a first vocal message may be received as input. A third audio signal may be simultaneously received with receipt of the first audio signal. The third audio signal may include a third vocal message that is different from the first vocal message and a second vocal message. The first audio signal may be buffered with a first input buffer of a control device while the third audio signal is buffered with a second input buffer of the control device. Simultaneous bidirectional translation of the first vocal message and the third vocal message may be performed. The second audio signal including a second vocal message may be provided as output.

20 Claims, 6 Drawing Sheets

(51) Int. Cl.
*G06F 40/47* (2020.01)
*G06F 40/55* (2020.01)
*G10L 13/047* (2013.01)
*G10L 15/26* (2006.01)
*G10L 15/28* (2013.01)

(52) U.S. Cl.
CPC ............ *G06F 40/55* (2020.01); *G10L 13/047* (2013.01); *G10L 15/26* (2013.01); *G10L 15/28* (2013.01)

(56) References Cited

U.S. PATENT DOCUMENTS

| | | | | |
|---|---|---|---|---|
| 2003/0115059 | A1* | 6/2003 | Jayaratne | G10L 15/005 704/235 |
| 2005/0171944 | A1* | 8/2005 | Palmquist | G06F 40/58 |
| 2006/0116075 | A1* | 6/2006 | Gallo | H04L 12/1881 370/331 |
| 2008/0077387 | A1* | 3/2008 | Ariu | G10L 15/22 704/E15.04 |
| 2008/0077390 | A1* | 3/2008 | Nagao | G10L 15/28 704/7 |
| 2009/0099836 | A1 | 4/2009 | Jacobsen et al. | |
| 2009/0217196 | A1* | 8/2009 | Neff | G06Q 10/10 715/799 |
| 2009/0306957 | A1* | 12/2009 | Gao | G06F 40/58 704/2 |
| 2011/0207447 | A1* | 8/2011 | Bhow | H04M 1/2535 455/569.1 |
| 2011/0246172 | A1* | 10/2011 | Liberman | H04M 3/56 348/14.09 |
| 2013/0289971 | A1* | 10/2013 | Parkinson | G06F 40/58 704/2 |
| 2015/0058023 | A1* | 2/2015 | Goo | G10L 15/005 704/277 |
| 2015/0347395 | A1* | 12/2015 | Cuthbert | G06F 16/683 704/2 |
| 2015/0347399 | A1* | 12/2015 | Aue | H04M 3/42 704/2 |
| 2018/0260388 | A1* | 9/2018 | Huang | G06F 40/58 |
| 2018/0322116 | A1* | 11/2018 | Huang | G06F 3/167 |
| 2020/0301976 | A1* | 9/2020 | Girardier | G10L 15/26 |
| 2023/0367817 | A1* | 11/2023 | Girardier | G06F 16/90332 |

FOREIGN PATENT DOCUMENTS

| | | |
|---|---|---|
| CN | 206339975 U | 7/2017 |
| EP | 1 912 388 A2 | 4/2008 |

\* cited by examiner

REAL-TIME VOICE PROCESSING

CROSS-REFERENCES TO RELATED APPLICATIONS

This application is a continuation of U.S. patent application Ser. No. 16/756,066, filed on Apr. 14, 2020, which is a U.S. National Stage Application of PCT International Application No. PCT/EP2018/076821, filed on Oct. 2, 2018, which claims priority to European Patent Application No. 17306438.7, filed on Oct. 20, 2017. The entire disclosures of all of the aforementioned Applications are hereby incorporated by reference, for all purposes, as if fully set forth herein.

BACKGROUND

The invention pertains to the technical field of the real-time voice processing, especially of spoken natural languages.

Some voice processing software and technologies are known. Such technologies become more and more accurate, especially in Natural Language Processing (NLP). For example, some earphones comprise software components able to provide a real-time translation, including wireless earphones communicating by Bluetooth technologies (Bluetooth is a trademark registered by SIG, Inc.). In the known technologies, there are multiple ways to provide such a service.

In a simple way to provide such a service, a master device equipped with a microphone and a speaker, such as a smartphone, ensure the voice processing. A first user uses the smartphone. A second user wears Bluetooth earbuds. The earbuds and the master device are interconnected. The earbuds worn by the second user send the second user input captured by the internal microphone of the earbuds to the smartphone through a Bluetooth link. A software component of the smartphone ensures the voice translation, for example the translation. Then, the processed content is sent to an internal speaker of the smartphone. In the opposite direction, the first user input is recorded using the microphone of the smartphone, processed by the software component of the smartphone, and sent to the earbuds over Bluetooth.

One of the two users has to use the smartphone has an input:output device. Such a technology is limited to two users. In the example of translation, this is limited to two different languages.

Another way is to use separately the two earbuds (left and right) of a pair. Each one of the two users wears one of the two earbuds. The microphone of the smartphone is used as a common input device. The two earbuds are connected to the smartphone using a True Wireless Stereo (TWS) audio link. One processed signal is sent on the right channel and the other one on the left channel. The voice input is captured using the microphone of the smartphone, then processed by the smartphone, and sent on the corresponding channel.

The two users have to share the smartphone microphone. Such a technology is also limited to two users, and two different languages for the translation example.

Another way is to use one master device for each pair of earbuds. Each pair of earbuds is connected over Bluetooth to its master device, such as a smartphone. When a first person talks, the voice input is captured by the internal microphone of his earbuds, then sent over Bluetooth to his corresponding master device. The said master device communicates with a second master device of a second person. The second master device sends the message over Bluetooth to the second pair of earbuds worn by the second person. Master devices can communicate over the Internet or any adapted communication protocol. The processing can be ensured by the first master device, the second master device, or even by one the earbuds pairs if they contain the software means to do it.

Two master devices are needed. To use a plurality of control devices and a plurality of intermediate links increase the transfer time and reduce the efficiency, especially when processing operations are ensured by distant devices (for example using internet). The comfort for users is reduced. The conversation is less natural. The "real-time" feeling is not satisfying.

The invention improves the situation.

The applicant proposes a control device of voice distribution comprising:
  at least one voice processing module arranged to
    receive as input an audio signal including a first vocal message, and
    provide as output an audio signal including a second vocal message, the first and second vocal messages being different one from the other and the second vocal message resulting from a processing of the first vocal message,
  a communication module arranged to establish and simultaneously manage a wireless, bidirectional and audio link with each one of a plurality of auxiliary devices, each link being connected to the input and/or the output of at least one voice processing module.

Such a device enables to ensure a voice processing, for example real-time translation, with a single master device, between more than two users and/or more than two different languages Known wireless earbuds are compatible with such a device. Thus, users do no need to obtain specific input/output devices.

In a second aspect of the invention, the applicant proposes a method of controlling voice processing system by a control device. The method comprises:
  establishing a wireless, bidirectional and audio link between a communication module of said control device and each one of a plurality of auxiliary devices,
  receiving, from at least one of the auxiliary devices, as input of at least one voice processing module of said control device, at least one audio signal including a first vocal message,
  providing as output of said least one voice processing module an audio signal including a second vocal message, the first and second vocal messages being different one from the other and the second vocal message resulting from a processing of the first vocal message,
  transmitting from said communication module the said second vocal message to at least one of the auxiliary devices by using the respective said link.

In a third aspect of the invention, the applicant proposes a system of voice processing comprising:
  a control device arranged to implement a method according to the above, and
  at least one auxiliary device, said auxiliary device being arranged to communicate by a wireless, bidirectional and audio link with the control device, said auxiliary device comprising at least one microphone arranged to feed the said audio link with an audio content and/or at least one speaker arranged to spread the audio content received on the said audio link.

In a fourth aspect of the invention, the applicant proposes a set to implement a system of voice processing. The set comprises:
- a control device able to implement a method according to the above, and
- at least one auxiliary device, said auxiliary device being able to communicate by a wireless, bidirectional and audio link with the control device, said auxiliary device comprising at least one microphone arranged to feed the said audio link with an audio content and/or at least one speaker arranged to spread the audio content received on the said audio link.

Optionally, some embodiments can have the following features, separately or in combination one with the others:
- The communication module includes a Bluetooth chip and wherein each wireless, bidirectional audio link is a Synchronous Connection-Oriented (SCO) or an enhanced Synchronous Connection-Oriented (eSCO) link according to the Hand-Free Profile (HFP) Bluetooth protocol. The said protocol is particularly well adapted to preserve the natural understanding of a human language
- The voice processing module includes a translation sub-module arranged to receive as input a first message in a first human language, and provide as output a second human language, the second message being a translation of the first message.
- The control device comprises at least one buffer disposed between said at least one voice processing module and the inputs and/or outputs of said auxiliary devices. This enables to create fluent vocal messages at the output.
- The control device comprises at least a first voice processing module and a second voice processing module, the communication module being further arranged to establish and manage at least one link between:
  - an auxiliary device, and
  - the input of the first voice processing module and to the output of the second voice processing module.

This enables to simultaneously ensure a bidirectional processing on the same link/canal.
- The communication module is further arranged to establish and simultaneously manage at least one supplementary link with a supplementary auxiliary device connected to the input of the second voice processing module and to the output of the first voice processing module. This enables to simultaneously ensure processing on at least two links/canals.
- The control device comprises at least two voice processing modules arranged to provide as output distinct audio signals, the device further comprising at least one mixing module, said mixing module being arranged to receive as inputs the at least two output audio signals from said at least two voice processing modules, and provide as a single output audio signal a mixed audio signal constructed from the at least two audio signals.

This enables to process and provide at least two distinct sources to at least one recipient by using a single link/canal for each recipient.
- The device further comprises at least one synchronizing module, said synchronizing module being interposed between the outputs of voice processing modules and a mixing module, said synchronizing module being arranged to delay at least one signal among the signals received by the mixing device in a manner to compensate a time shift resulting from different processing steps processed by at least one voice processing module and to enhance the conformity of the chronological order of the second vocal messages with respect to the chronological order of the first vocal messages. This preserves the original order of the messages.

In a fifth aspect of the invention, the applicant proposes a program product comprising a set of instructions which, when executed by a processor, executes a method according to the above.

In a sixth aspect of the invention, the applicant proposes a non-transitory computer-readable storage medium comprising a program product stored thereon and executable by a processor in the form of a software agent including at least one software module comprising instructions to implement a method according to the above.

Other features, details and advantages will be shown in the following detailed description and on the figures, on which:

Figure 1:
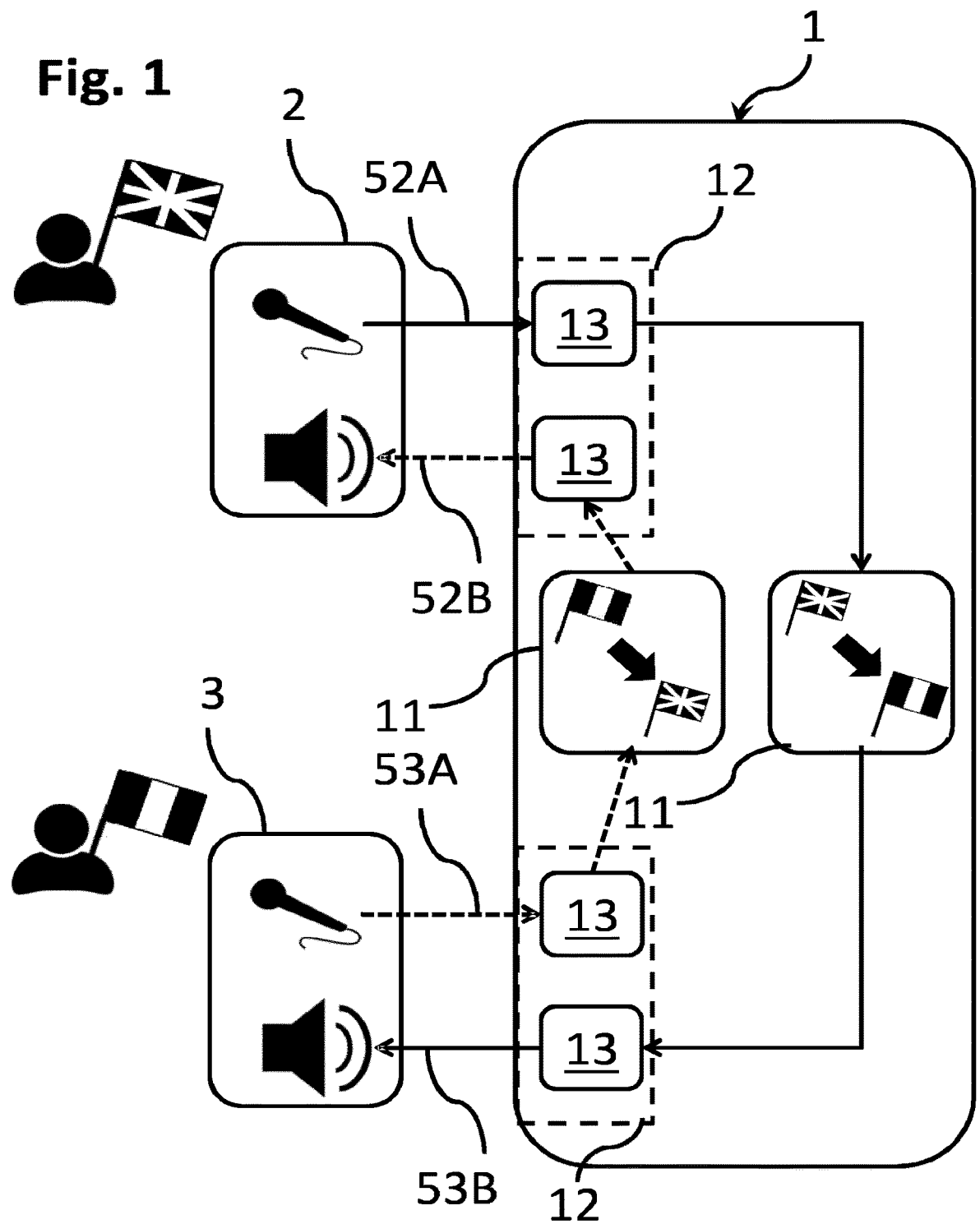
FIG. 1 shows an embodiment of a system according to the invention.

Figures and the following detailed description contain, essentially, some exact elements. They can be used to enhance understanding of the invention and, also, to define the invention if necessary.

In the following, some components of the devices can be temporarily "inactive" or "neutralized" in function of the situation. This has to be understood as a general meaning: such a component can be totally bypassed (or switch-off), or it can ensure operations without having visible effect. For example, if there is a single voice as input, a mixing device can be totally by-passed. The mixing device can also mix a first single audio signal containing the said voice with a signal audio signal containing only silence, and obtaining a mixed signal containing a single voice. To treat an audio signal containing only silence as any other audio signal has one advantage: this prevent an automatic interruption of some communication links between two devices, for example when some devices are arranged to preserve energy consuming by being disconnected in absence of signal.

Figures show embodiments of a system of voice processing. Each system comprises a control device 1 (or master device) and at least one auxiliary device 2, 3, 4, 5 (or slave device).

Unless specific indication in the following, the embodiments described in detail hereinafter are only few examples and can be combined one with the others. Some features of one embodiment can easily be transposed to another embodiment. On the figures, the components constituting each device are represented only partially in function of a given situation of use (numbers of users, languages in use, etc.). Some of components of the devices can be temporarily inactive in function of the situation. For example, the control devices 1 represented on the plurality of figures can be a single one wherein its components are operational or inactive in function of the situation. Here and in the following, the word "component" has to be understood in a general meaning of a set of physical elements and functional elements (including software) operatively cooperating.

The control device 1 can be, for example, a computer, a pad or a smartphone.

The control device 1 comprises at least one voice processing module (or block) 11 and a communication module (or block) 12. The voice processing module 11 is arranged to
receive as input an audio signal including a first vocal message, and
provide as output an audio signal including a second vocal message.

The first and second vocal messages are different one from the other. The second vocal message results from a processing of the first message.

In the examples, voice processing modules 11 are software members executed by a processor of the control device 1. In the following detailed examples, voice processing modules 11 are translation modules 11. In other words, the voice processing modules 11 include a single sub-module which is a translation (sub-)module 11. The translations modules 11 are arranged to receive as input a first message in a first human language, and provide as output a second human language, the second message being a translation of the first message.

In various embodiments, the voice processing modules 11 can comprise one or a plurality of sub-modules different from a translation sub-module, in addition or in replacement of a translation module. A processing module can comprise:
a translation sub-module;
a noise attenuation sub-module, which is arranged to artificially reduce the volume of the environment noises;
a voice enhancer sub-module, which is arranged to increase the volume of a speech among an audio signal acquired by a microphone in real conditions;
an audio analysis sub-module, arranged to isolate parts of speech, for example the beginning of each word, in order to increase the volume of the said parts;
a combination of at least two of the above sub-modules.

Each one of the above examples sub-modules is known by itself. In order to improve the clarity and conciseness of the description, only the example of a voice processing module being a translation module will be described in details. A person skilled in the art would easily transpose the following detailed examples to other type of modules or other combination of modules.

In order to enhance the processing by adapting it to each situation, the control device can be arranged to receive as input, in addition to the audio signal to process, data relative to each situation. For example, the control device can receive:
an identifier of the auxiliary device or an identifier of type of the auxiliary device,
a reference audio signal issued from another source and enabling to identify the noise, for example from an integrated microphone of the control device, and/or
an identifier of the original language.

Such data can be used as parameters to adapt the processing.

Such translation modules 11 comprise, for example a first unit allowing converting a voice into a text and vice versa, and a second unit ensuring a translation of a text from a language to another one. Such software is known by itself. For example, Google Inc. proposes the following software elements: "Google Speech" and "Google translate".

The communication module 12 is an operational combination of physical components (for example antenna) and software components. The communication module 12 is arranged to establish and simultaneously manage a link 52, 53 with each one of a plurality of auxiliary devices 2, 3. Each link 52, 53 is a bidirectional link. Each link 52, 53 includes both:
an uplink 52A, respectively 53A, oriented from the auxiliary device 2, respectively 3, toward the control device 1, and
a downlink 52B, respectively 53B, oriented from the control device 1 toward the auxiliary device 2, respectively 3.

Each link 52, 53 is a wireless link. Preferably, the wireless is limited to a few tens of meters, for example inferior to 10 meters or 20 meters. Preferably, the wireless link uses radio waves that are situated in the UHF band (between 300 MHz and 3 GHz). Each link is an audio link, meaning that a signal corresponding to an audio signal has to be transmitted on the link 52, 53. More specifically, the link is adapted to carry a signal corresponding to a human voice. Each link 52, 53 extends between an auxiliary device 2, 3 at one end, and an input and/or an output of at least one translation module 11 at the other end.

In the following examples, the communication module 12 includes a Bluetooth chip. Bluetooth is a communication standard that is well-known to the person skilled in the art, defined since 1994 and managed by a group of organizations (Bluetooth SIG) that has issued successive versions. The current version is version 5. Bluetooth enables a short-distance bidirectional exchange of data (this is a "piconet" network, which designates a network covering a personal zone). Therefore, the range of Bluetooth equipment is limited to a few tens of meters. Bluetooth uses radio waves that are situated in the UHF band (between 300 MHz and 3 GHz). Bluetooth aims to simplify connections between electronic devices by removing cable connections. Thus, Bluetooth enables cables between a source multimedia device (hi-fi system, car radio, computer, tablet, mobile telephone, etc.) to be replaced by wireless communications and target multimedia devices such as speakers arranged to play a received multimedia stream. Bluetooth speakers have met with a certain success due to their high portability.

In the following examples, each wireless bidirectional audio link 52A, 52B; 53A, 53B; 54A, 54B; 55A, 55B is a Synchronous Connection-Oriented link (SCO) or an enhanced Synchronous Connection-Oriented (eSCO) link according to the Hand-Free Profile (HFP) Bluetooth protocol, the latest version being 1.7.1. Other wireless bidirectional audio links can be used, including future versions of the HFP protocol. Links based on synchronous connections are preferred because it enables to preserve the order of data packets. This is particularly advantageous for preserving the intelligibility of a human speech. The SCO/eSCO links are particularly well adapted to transmit human voices. Some of existing devices already contain the means to support SCO/eSCO links, especially earpods and headsets which are made to be wireless connected to smartphones. As a consequence, some existing devices can be used as an auxiliary device in combination with a control device to obtain a system of real-time translation.

In the existing systems, the HFP protocol is used to connect a smartphone to a slave device to have phone calls (a wearable device or an integrated microphone speaker into a vehicle for example). A single slave device is connected by HFP to the master device at each time. If a second slave device is connected to the master device, the first one is automatically disconnected. There is no simultaneous plurality of wireless bidirectional audio links with the master device.

According to the Bluetooth standard in force, a master device can establish a maximum of three HFP links, to different remote devices in the same piconet. This limitation is due to the fact that each slave active device in a piconet is assigned a primary 3-bit logical transport address (LT_ADDR). The all-zero LT_ADDR is reserved for broadcast messages (or ASB for "Active Slave Broadcast"). The master does not have a LT_ADDR. A secondary LT_ADDR is assigned to the slave for each SCO/eSCO logical transport in use in the piconet. According to this, one understands that the limitation to three auxiliary devices simultaneously connected to a control device 1 by respective HFP links is only due to the Bluetooth standards. In other words, a system comprising more than three auxiliary devices can be obtained by using protocols different from the current Bluetooth protocol in other embodiments, a communication module 12 arranged to establish and simultaneously manage a plurality of wireless, bidirectional and audio links, different from the HFP protocol, can be used. It is also possible to implement more than one Bluetooth chip in the control device and to combine them to have more than three HFP links.

In the following examples, the control device 1 is described only as a control device (master device) which is not used directly by a specific user to talk or listen. For example, the control device 1 is put on a meeting table and the users are sitting around the table, each user wearing his auxiliary device 2, 3, 4, 5, for example headphones. In various embodiments, if the control device also comprises a microphone and/or an audio output, it can be adapted to be used by a supplementary user to participate in a discussion and obtain a translated message. In such a case, the architecture is similar to the auxiliary devices, except for the link between the microphone and/or the audio output: the microphone and/or the audio output can be integrated in the control device 1 itself, or be connected to the control device 1 by a wire or any other known link.

Each auxiliary device 2, 3, 4, 5 comprises a communication module adapted to communicate with the communication module 12 of the control device 1, for example a Bluetooth chip. Each auxiliary device 2, 3, 4, 5 is arranged to communicate by a wireless, bidirectional and audio link with the control device 1. Each auxiliary device 2, 3, 4, 5 comprises at least one microphone arranged to feed the said audio link with an audio content and/or at least one speaker arranged to spread the audio content received on the said audio link.

In the following examples, it is considered that each user can be alternatively a speaker and a listener. It is considered that each user uses a single auxiliary device and that each auxiliary device is not shared used by another user. As a consequence, each auxiliary device 2, 3, 4, 5 comprises both a component to capture a voice, for example a microphone, and a component to stream a voice by audio waves, for example a speaker. In other embodiments, an auxiliary device can be deprived from microphone or be deprived from speaker. Each auxiliary device 2, 3, 4, 5 can have a form of a single piece, for example headphones including a microphone. Each auxiliary device 2, 3, 4, 5 can have a form of a plurality of pieces wireless connected, for example earpods including a microphone. In case of wireless connected pieces, one of the pieces comprises the communication module connected to the communication module of the control device 1. The other piece(s) are connected to the first one by wireless means independently from the said communication module.

In the following example of FIG. 1, it is considered that each user speaks and understands a single language. The control device 1 is arranged to receive original messages in a language by the uplink of a bidirectional link from an auxiliary device and to transmit other translated messages in the same language by the downlink of the said bidirectional link to the said auxiliary device. For example, the language link used for each link can be selected via an interface of the control device 1 and/or can be automatically adapted in function of a recognized language received by the corresponding uplink. In various embodiments, the translated language used on the downlink can be different from the language received on the uplink.

On the figures, a plurality of translation modules 11 are represented, one for each type of translation, depending on the languages used in the examples. This is schematic. The control device 1 can contain a single translation module ensuring a plurality of translations types. The translating operations can be ensured, for example, by a single processor. The selected language for each translation operation can be considered as a parameter of the operation to execute.

In the control devices 1 of figures, one communication module 12 is represented for each auxiliary device 2, 3, 4, 5. This is schematic. The control device 1 can contain a single communication module 12 managing a plurality of distinct links with the auxiliary devices 2, 3, 4, 5.

In the following examples, the control device 1 comprises at least one buffer 13. In the examples, the buffers 13 are considered as pertaining to the communication module 12. A buffer 13 is disposed between at least one translation module 11 and the inputs and/or outputs of the auxiliary devices 2, 3, 4, 5. The buffers 13 enable to store parts of a message (a vocal sentence for example) temporarily and in real-time. Then, portions of a message constituted of such parts can be transmitted in a single operation toward the translation module 11 (coming from an uplink) or toward the auxiliary devices 2, 3, 4, 5 (via a downlink). This improves the natural aspect of the artificial voices reciting a translated message. The comfort of users is increased.

In the example of FIG. 1, there are only two users. A first user speaks and understands a single language, for example English, and uses the first auxiliary device 2. The second user speaks and understands a single language, for example French, and uses a second auxiliary device 3. The two users wish to discuss together in real-time. Preferably, they wish to talk at the same time because it is more natural than a "turn-by-turn" discussion.

Prior to the conversation, or at the beginning, the control device 1 establishes a wireless, bidirectional and audio link 52A, 52B between the communication module 12 of said control device 1 and the first auxiliary device 2. The control device 1 establishes a wireless, bidirectional and audio link 53A, 53B between the communication module 12 of said control device 1 and the second auxiliary device 3. A piconet is created, wherein the control device 1 is a master device and the auxiliary devices 2, 3 are slave devices. The piconet, including the two bidirectional links 52A, 52B and 53A, 53B, is now established and will be managed during the conversation session.

At the time represented on FIG. 1, the first user is talking (in English) and listening translated messages (in English), while the second user is talking (in French) and listening translated messages (in French).

The input voice of the first user (in English) is captured by a microphone of the auxiliary device 2. If necessary, a buffer 13 of the first auxiliary device 2 is used. Then, the audio signal corresponding to a first message (for example a sentence) is transmitted from the first auxiliary device 2 toward the control device 1 by using the uplink 52A of the bidirectional link 52. The control device 1 receives, as input of a translation module 11 from the first auxiliary device 2, the audio signal including the first message in the first human language (English). The translation module 11 operates to translate the received message (in English) into its translated audio version (in French). In other words, the control device 1 provides as output of said translation module 11 an audio signal including a second message (a translated message) in a second human language (French). The second message is transmitted from the communication module 12 to the second auxiliary device 3 by using the downlink 53B of the bidirectional link.

When received, the second auxiliary device 3 spreads the translated message (in French) to the second user by the speaker.

At the same time, the second user talks (in French). The operations to provide a translated message (in English) to the first user are similar to the previous ones and in the opposite way. The translation from French to English in destination to the first user can be made at the same time because of the bidirectional feature of the links 52, 53.

In the example represented on FIG. 1, there is an input buffer 13 and an output buffer 13 handled independently and disposed on each link 52, 53. This enables a simultaneous bidirectional translation.

Figure 2:
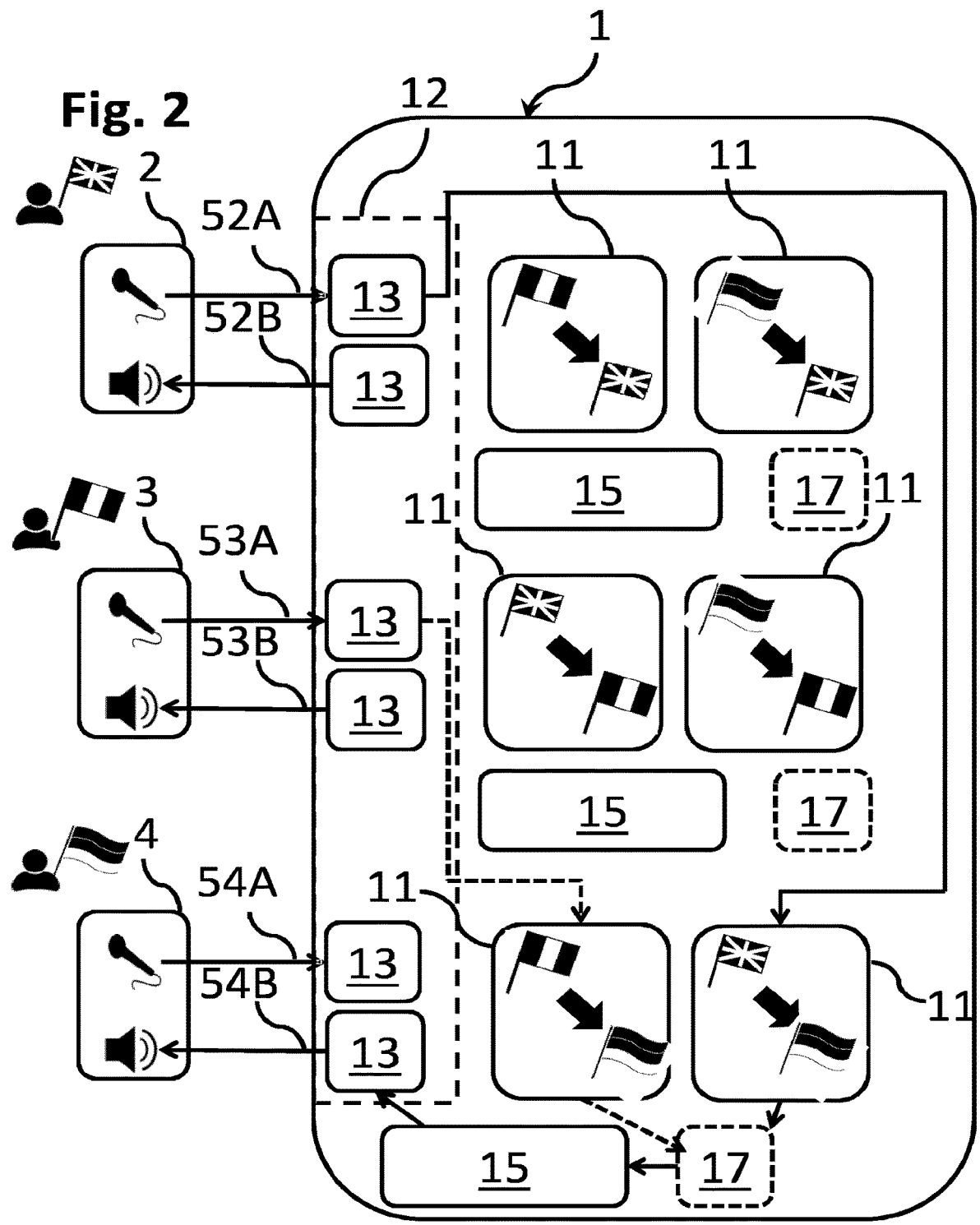
FIG. 2 shows an embodiment of a system according to the invention.

In the example of FIG. 2, there are three users, each speaking a different language from the two others. A first user speaks a single language, for example English, and uses the first auxiliary device 2. The second user speaks a single language, for example French, and uses a second auxiliary device 3. The third user speaks and understands a single language, for example German, and uses a third auxiliary device 4. The three users wish to discuss together (conference mode). Preferably, they wish to talk at the same time because it is more natural than a "turn-by-turn" discussion. In order to limit the quantity of information represented on FIG. 2, the exchanges between the first and the second users are not represented. Only the elements useful for the third user are represented. In this embodiment, translations from French to English and vice versa can be enforced by the control device simultaneously.

The system integrates two translation modules 11 for each pair of language (because the two ways are useful), which means six translation modules 11 in the example of FIG. 2. The six translation modules 11 are simultaneously used only if the three users talk simultaneously and if the real-time translation toward the two other languages are activated. On FIG. 2, a situation is represented where only the first and the second users are talking simultaneously and the translation toward the first and the second users are deactivated (in English and in French respectively). As a consequence, only two translation modules 11 are actives. The translation module 11 ensures a translation from English to German, and the translation module 11 ensures a translation from French to German, are active.

The third user wishes to understand both the first user's message and the second user's message. The system further includes a mixing module (or block) 15. The mixing module is arranged to
   receive as inputs the two output audio signals from the two translation modules 11, and
   provide as a single output audio signal a mixed audio signal constructed from the at least two audio signals. This enables to transmit the audio signal containing two superimposed messages on the single downlink 54B.

As represented on FIG. 2, the system comprises a mixing module 15 for each group of translation modules 11 arranged to translate a message in a common language. In the situation represented on FIG. 2, only the mixing module 15 associated to the translation modules 11 arranged to translate toward German language is active. The others are temporarily inactive.

In the example of FIG. 2, the system further comprises at least one synchronizing module 17. The synchronizing module 17 is interposed between the outputs of translations modules 11 and the mixing module 15. The synchronizing module 17 is arranged to delay at least one signal among the signals received by the mixing device 15 in a manner to compensate a time shift resulting from different translation steps processed by at least one translation module 11. This enables to enhance the conformity of the chronological order of the translated messages with respect to the chronological order of the original messages.

Figure 4:
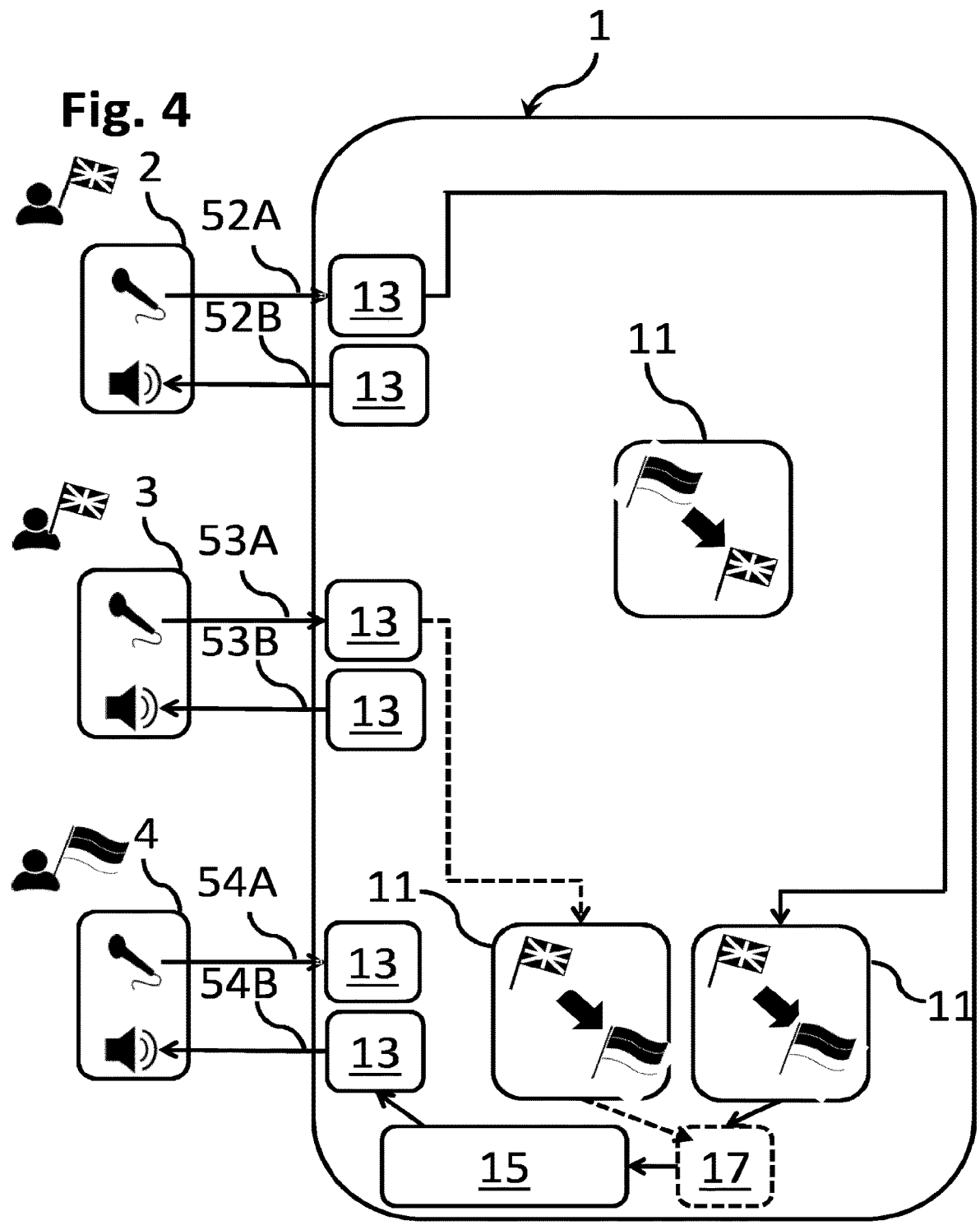
FIG. 4 shows an embodiment of a system according to the invention.

In the example of FIG. 2, the original languages of the two active translation modules 11 have different original languages (English to German, and French to German). Their inputs are separately translated by two different translation modules 11, then mixed by the mixing module 15 and finally sent. In various embodiments, a mixing module 15 can be used to mix messages issued from two similar translation modules 11, for example if two users are talking simultaneously in the same language. Such a situation is represented on FIG. 4: the first and second users both talking in English. Two simultaneous English languages have to be translated at the same time in German for the third user. In the embodiment of FIG. 4, the synchronizing module 17 is similar to the synchronizing module 17 of FIG. 2: it is interposed between the outputs of translations modules 11 and the mixing module 15 and arranged to delay one signal among the two signals received by the mixing device 15 in a manner to compensate a time shift resulting from different translation steps processed by the two translation modules 11. This enables to enhance the conformity of the chronological order of the translated messages with respect to the chronological order of the original messages.

The synchronizing modules 17 are optional. They can be seen as a supplementary layer to compensate translation modules 11 having different processing times. Thus, to better reproduce the live conversation, especially when two persons are speaking at the same time, the system preferably integrates a synchronization layer. If one translation of the content of the buffer 13 of one speaker takes more time than the translation of another content, the system will wait until both are finished before mixing them.

Figure 3:
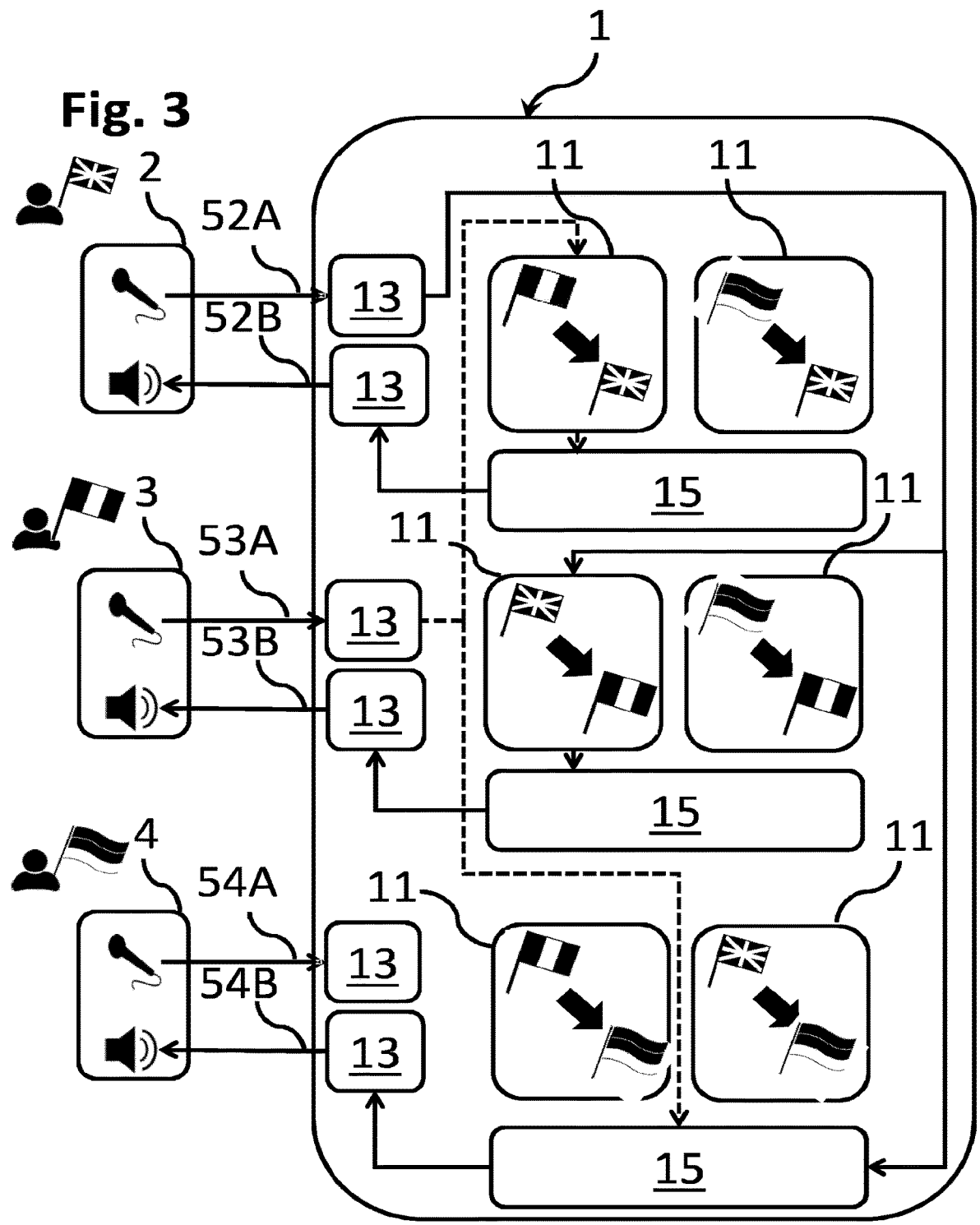
FIG. 3 shows an embodiment of a system according to the invention.

In the example of FIG. 3, the users are the same as in FIG. 2. The three users wish to discuss together (conference mode). Preferably, they wish to talk at the same time because it is more natural than a "turn-by-turn" discussion. Contrary to FIG. 2, the translations from the first user toward the second user (English to French) and from the second user toward the first user (French to English) are represented. The situation represented on FIG. 3 is similar to thus of FIG. 2, with the following exception: the third user understands both English and French and do not need translation.

In order to limit the quantity of information represented on FIG. 3, the data flows issued from the third user (in German) are not represented.

In such a situation, the mixing modules 15 and the synchronizing modules 17 related to the third user is used to combine the two messages from the first and the second user into a single mixed audio signal without preliminary translation. The translation modules 11 able to translate in German are neutralized because the third user understands both English and French.

In each embodiment, the translation modules can be temporarily neutralized. In such a situation, the device 1 becomes temporarily a relay to transmit messages from one auxiliary device to another one or to a plurality of other auxiliary devices without translation. An uplink 52A, 53A, or 54A is directly connected to the other downlinks 52B, 53B, 54B, without translation module 11 interposed.

Figure 5:
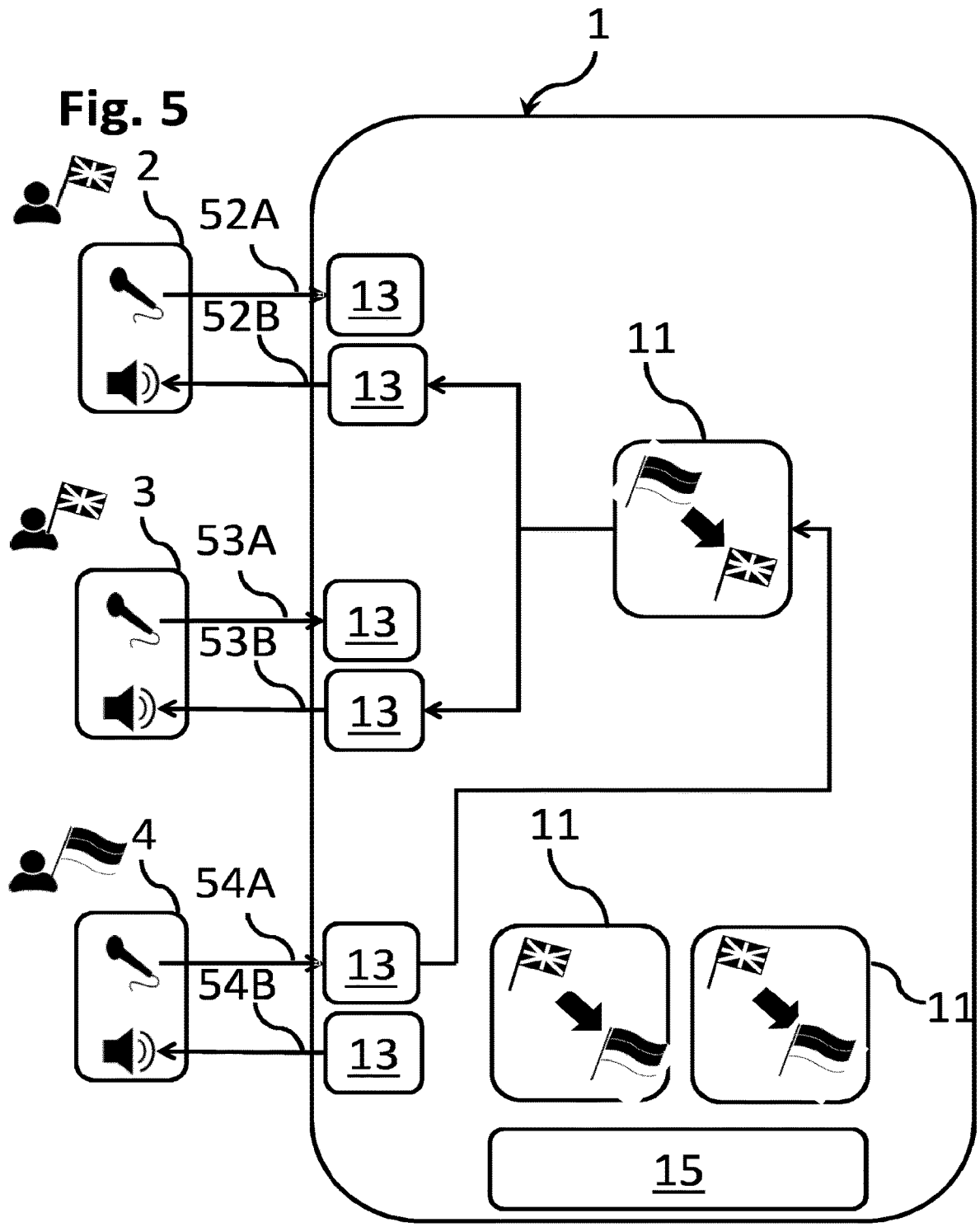
FIG. 5 shows an embodiment of a system according to the invention.

In the situation represented on FIG. 5, the first and the second users both understand the same language, for example English. The third user is speaking in another language, for example German. As a consequence, a single translation module 11 is needed: the translated message in English is transmitted toward both the first and the second user.

Figure 6:
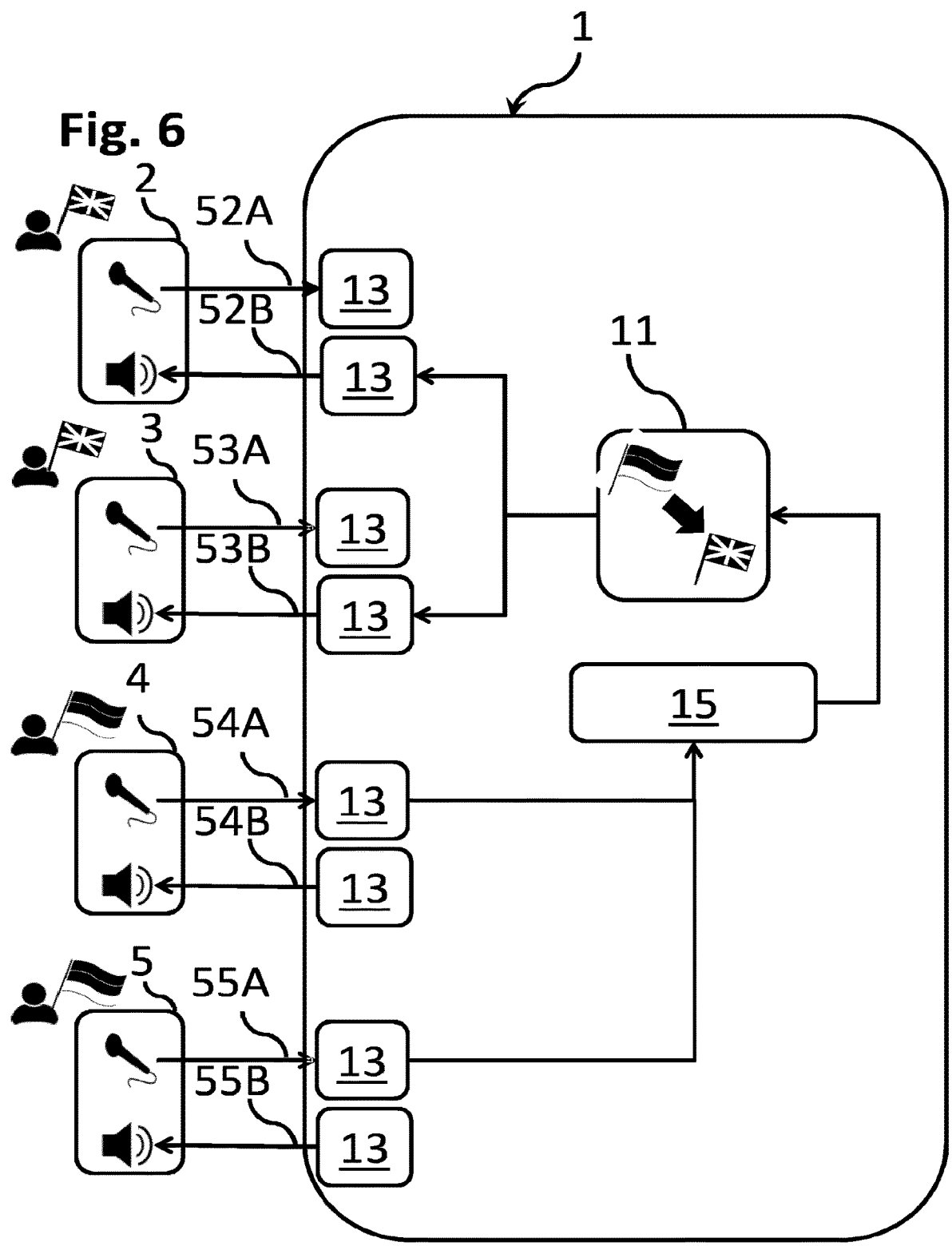
FIG. 6 shows an embodiment of a system according to the invention.

The situation represented on FIG. 6 is equivalent to thus of FIG. 5 but there are two simultaneous speakers: the third and a fourth speaker are speaking at the same time in the same language. The fourth user uses a fourth auxiliary device 5 and a fourth wireless bidirectional and audio link 55A, 55B. Because of the same language used (German), the single translation module 11 is sufficient. But, due to the simultaneity, the two original messages have to be mixed by a mixing module 15 before to be translated as a single audio source. The embodiment represented on FIG. 6 includes four auxiliary devices 2, 3, 4, 5. As explained above, this is not possible with a control device 1 containing a single Bluetooth chip arranged to enforce the current version (1.7.1) of the HFP Bluetooth protocol due to the limitation of the logical transport address. This embodiment implies to use a combination of Bluetooth chips in the control device 1 and/or a protocol deprived from the said limitation.

The previous examples can be combined in a single adaptive system in function of the situations. The systems allow three or more persons who do not speak the same language to have a real-time conversation using known auxiliary devices, for example Bluetooth earbuds/headsets connected to a control device used as a host device that integrates multiple Bluetooth chipsets to have more HFP links. Such systems can be particularly useful for international business meetings and conferences.

As explained at the beginning, the translation module 11 can be replaced or completed by other types of processing modules in the above examples. For example, enhancing the intelligibility of a speech by audio processing can be useful for business meetings and conferences in large rooms and/or in a noisy environment, combined or not with translations.

In the previous detailed description, an entire system including a control device 1 and a plurality of auxiliary devices. One person skilled in the art would understand that a control device, alone and by itself, can be adapted to be combined with known auxiliary devices. Due to the software aspect of the control device, the invention can be view as a method, implemented into a control device. The invention can also have the form of a set ready to be operational, and optionally comprising auxiliary devices which can be preset to be immediately compatible with the control device. The method implemented of on the control device can also be view as a program product by itself and/or as a medium on which the same program product is stored.

The invention is not limited to the method, devices, system, program products, sets and storage mediums described here, which are only examples. The invention encompasses every alternative that a person skilled in the art would envisage in the scope of the requested protection.

What is claimed:

1. A control device comprising:
at least one voice processing module configured to:
receive as input a first audio signal comprising a first vocal message; and
provide as output a second audio signal including a second vocal message, where the second vocal message is different from the first vocal message, and the second vocal message is based on the first vocal message; and
a communication module configured to:
establish and simultaneously manage a wireless, bidirectional audio link with each auxiliary device of a plurality of auxiliary devices; and
receive a third audio signal simultaneously with receipt of the first audio signal, the third audio signal comprising a third vocal message that is different from the first vocal message and the second vocal message;
where:
the first audio signal is buffered with a first input buffer of the control device while the third audio signal is buffered with a second input buffer of the control device,
the control device performs simultaneous bidirectional translation of the first vocal message and the third vocal message, and
the first input buffer is different from the second input buffer.

2. The control device as recited in claim 1, further comprising at least two voice processing modules arranged to output distinct audio signals.

3. The control device as recited in claim 2, further comprising at least one mixing module arranged to:
receive as inputs the distinct audio signals from said at least two voice processing modules, and
provide as a single output audio signal a mixed audio signal constructed from the distinct audio signals.

4. The control device as recited in claim 2, further comprising:
at least one synchronizing module interposed between the outputs of voice processing modules; and
a mixing module;
wherein the synchronizing module is configured to delay at least one signal received by the mixing module.

5. The control device as recited in claim 4, wherein the synchronizing module is configured to delay the at least one signal to compensate a time shift resulting from different processing steps processed by at least one of the at least two voice processing modules.

6. The control device as recited in claim 4, wherein the synchronizing module is configured to delay the at least one signal to enhance conformity of a chronological order of second vocal messages with respect to a chronological order of first vocal messages.

7. The control device as recited in claim 1, where the communication module is further configured to establish and manage at least one link between the control device and a first auxiliary device that is coupled to an input of a first voice processing module and to an output of a second voice processing module.

8. The control device as recited in claim 7, where the communication module is further configured to establish and simultaneously manage at least one supplementary link with a supplementary auxiliary device that is connected to an input of the second voice processing module and to the output of the first voice processing module.

9. A method comprising:
- establishing and simultaneously managing a wireless, bidirectional audio link with each auxiliary device of a plurality of auxiliary devices;
- receiving as input a first audio signal comprising a first vocal message;
- receiving a third audio signal simultaneously with receipt of the first audio signal, the third audio signal comprising a third vocal message that is different from the first vocal message and a second vocal message;
- buffering the first audio signal with a first input buffer of a control device while the third audio signal is buffered with a second input buffer of the control device, where the first input buffer is different from the second input buffer;
- performing simultaneous bidirectional translation of the first vocal message and the third vocal message; and
- providing as output the second audio signal including a second vocal message, where the second vocal message is different from the first vocal message, and the second vocal message results is based on the first vocal message.

10. The method as recited in claim 9, further comprising outputting, by at least two voice processing modules, distinct audio signals.

11. The method as recited in claim 10, further comprising:
- receiving as inputs, by at least one mixing module, the distinct audio signals from said at least two voice processing modules; and
- providing as a single output audio signal, by the at least one mixing module, a mixed audio signal constructed from the distinct audio signals.

12. The method as recited in claim 10, further comprising:
- delaying, by a synchronizing module, at least one signal received by a mixing module.

13. The method as recited in claim 12, wherein the delaying is to compensate a time shift resulting from different processing steps processed by at least one of the at least two voice processing modules.

14. The method as recited in claim 12, wherein the delaying is to enhance conformity of a chronological order of second vocal messages with respect to a chronological order of first vocal messages.

15. The method as recited in claim 9, further comprising establishing and managing at least one link between the control device and a first auxiliary device that is coupled to an input of a first voice processing module and to an output of a second voice processing module.

16. The method as recited in claim 15, further comprising establishing and simultaneously managing at least one supplementary link with a supplementary auxiliary device that is connected to an input of the second voice processing module and to the output of the first voice processing module.

17. One or more non-transitory, machine-readable media having machine-readable instructions thereon which, when executed by one or more processing devices, cause the one or more processing devices to perform operations comprising:
- establishing and simultaneously managing a wireless, bidirectional audio link with each auxiliary device of a plurality of auxiliary devices;
- receiving as input a first audio signal comprising a first vocal message;
- receiving a third audio signal simultaneously with receipt of the first audio signal, the third audio signal comprising a third vocal message that is different from the first vocal message and a second vocal message;
- buffering the first audio signal with a first input buffer of a control device while the third audio signal is buffered with a second input buffer of the control device, where the first input buffer is different from the second input buffer;
- performing simultaneous bidirectional translation of the first vocal message and the third vocal message; and
- providing as output the second audio signal including a second vocal message, where the second vocal message is different from the first vocal message, and the second vocal message results is based on the first vocal message.

18. The one or more non-transitory, machine-readable media as recited in claim 17, the operations further comprising outputting distinct audio signals.

19. The one or more non-transitory, machine-readable media as recited in claim 18, the operations further comprising receiving as inputs and providing, as a single output audio signal a mixed audio signal constructed from the distinct audio signals.

20. The one or more non-transitory, machine-readable media as recited in claim 18, the operations further comprising delaying at least one signal to compensate a time shift resulting from different processing steps.

* * * * *